United States Patent
Robert

[11] Patent Number: 5,945,492
[45] Date of Patent: Aug. 31, 1999

[54] GRAFT POLYMERS WITH CONTROLLED VISCOSITY

[75] Inventor: Patrice Robert, Beaumont le Roger, France

[73] Assignee: Elf Atochem S.A., France

[21] Appl. No.: 08/950,771

[22] Filed: Oct. 15, 1997

[30] Foreign Application Priority Data

Oct. 16, 1996 [FR] France ................................. 96 12624

[51] Int. Cl.⁶ ....................................................... C08F 2/00
[52] U.S. Cl. ........................ 526/219.2; 525/285; 525/322; 526/204; 526/217; 526/220; 528/271; 528/403
[58] Field of Search ..................................... 525/285, 322; 526/204, 217, 219.2, 220; 528/271, 403

[56] References Cited

U.S. PATENT DOCUMENTS 5,344,888  9/1994  Wild et al. ............................... 525/301
5,412,047  5/1995  Georges et al. ......................... 526/204

FOREIGN PATENT DOCUMENTS 0 726 280  8/1996  European Pat. Off. .
0 726 289  8/1996  European Pat. Off. .
294 493  10/1983  Germany .

*Primary Examiner*—Samuel A. Acquah
*Attorney, Agent, or Firm*—Bell, Boyd & Lloyd

[57] ABSTRACT

The present invention relates to a process for the preparation of graft thermoplastic polymers in which at least one thermoplastic polymer (A) is grafted with a functional monomer in the presence of a substance which inhibits or reduces the crosslinking or the depolymerization of (A).

This substance may be a stable nitroxide radical.

Graft polymers are useful as compatibilizing agents in mixtures of polymers and as coextrusion binders. The invention also relates to multilayer structures including these binders.

6 Claims, No Drawings

GRAFT POLYMERS WITH CONTROLLED VISCOSITY

FIELD OF THE INVENTION

The present invention relates to graft polymers with controlled viscosity and more particularly those grafted with functional monomers such as, for example, maleic anhydride. They are useful as compatibilizing agents in mixtures of polymers or as coextrusion binders.

The invention also relates to these blends and to the multilayers including these coextrusion binders.

The invention also relates to a process for preparing these graft polymers.

BACKGROUND OF THE INVENTION

Radical grafting of functional monomers onto polyolefins is done either in the molten state or in solution, using radical initiators such as peroxides, or in the solid state, by irradiation. Owing to the action of the radicals, secondary reactions take place at the same time as the grafting reaction. They result in an increase in the molecular mass in the case where the polymer to be grafted is polyethylene, or to its decrease in the case where it is polypropylene. If the quantity of radicals needed for the grafting reaction is large, the change in the molecular mass of the polyolefin produces a considerable change in its melt viscosity. These phenomena reduce the quantity of reactive functional groups that can be incorporated in the polyolefin by radical grafting of functional monomers.

Applicant has discovered the advantage of employing stable free radicals when polyolefins are being grafted with a functional monomer. It makes it possible to limit scission reactions in the case of polypropylene and crosslinking reactions in the case of polyethylene. In both cases this results in an improvement in processing, for example by extrusion, of the grafted products.

At the same graft content, PP (polypropylene) grafted in the presence of stable radicals is more viscous; it therefore behaves better as a melt and is easier to granulate.

Polyethylene grafted in the presence of stable radicals is less viscous; when it is extruded, the pressure at the extruder head is reduced and its processing is easier, even at high graft contents.

The prior art U.S. Pat. No. 5,344,888 has described the grafting of polypropylene homo- and copolymers with maleic anhydride in the presence of peroxide initiators and in the presence of a coagent which may be, for example, diallyl maleate, diallyl succinate or triallyl cyanurate. These are not stable free radicals, nor generators of such radicals. The examples show that it is possible to obtain polypropylene containing up to 2% by weight or more of grafted maleic anhydride.

However, although this process allows large quantities of maleic anhydride to be grafted, it does not enable the deterioration of viscosity to be avoided.

The prior art EP 726 289 describes generalities relating to the stabilization of polymers with stable free radicals, for example during their grafting. The examples show the grafting of styrene butadiene diblock copolymers with mercaptopropionic acid or methacrylic acid.

Grafting in the absence of stable free radicals results in a polymer containing 2.8% of grafts, but which is crosslinked when compared with the initial polymer, whereas grafting in the presence of stable free radials avoids the crosslinking of the initial polymer, but the graft content drops to 2.4%.

This prior art shows either the protection of the styrene polymers or of the PMMA by stable radicals (TEMPO) to avoid their depolymerization during their melting, or the grafting of acids onto styrene block copolymers. The quantities of TEMPO (2,2,6,6-tetramethyl-1-piperidinyloxy) are 10 millimoles per kg of polymer which is being grafted (i.e. 0.15%). The description mentions a range of from 0.05 to 0.5% of stable radicals in relation to the weight of the polymer to be grafted and of the graft unit. These quantities correspond to a range of from 3.5 to 33 millimoles of TEMPO per kg of the total polymer to be grafted and of the graft unit.

Grafting of polyethylenes and of polypropylenes with functional monomers and, in particular, unsaturated carboxylic acid anhydrides, is not exemplified.

DESCRIPTION OF THE INVENTION

The objective of the present invention is to find a compromise between the alteration of the viscosity during the grafting of the functional monomer and the quantity of graft units. For example, in the case of polypropylene it has been discovered that it is possible to graft large quantities of functional monomer while preserving an acceptable viscosity, to recover and granulate the polypropylene thus grafted and, above all, to be able subsequently to employ it.

The present invention relates to a process for the preparation of graft thermoplastic polymers in which at least one thermoplastic polymer (A) is grafted with a functional monomer in the presence of a substance which inhibits or reduces the crosslinking or the depolymerization of (A).

A number of these graft polymers are novel per se; the invention relates also to these products.

The invention also relates to mixtures of polymers including the products obtained by the process of the invention. The invention also relates to coextrusion binders including the graft polymers obtained by the process of the invention. It also relates to the multilayer structures including the above binders.

The polymer (A) may be, for example, a polyethylene homo- or copolymer, a polypropylene homo- or copolymer, a polybutene homo- or copolymer or a polystyrene homo- or copolymer.

Where ethylene copolymers are concerned, comonomers that may be mentioned are:

alpha-olefins, advantageously those containing from 3 to 30 carbon atoms.

Examples of alpha-olefins containing 3 to 30 carbon atoms, as possible comonomers, include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These alpha-olefins may be employed on their own or as a mixture of two or of more than two.

esters of unsaturated carboxylic acids, such as, for example, alkyl (meth)acrylates, it being possible for the alkyls to contain up to 24 carbon atoms.

Examples of alkyl acrylate or methacrylate are especially methyl methacrylate, ethyl acrylate, n-butyl acrylate, isobutyl acrylate and 2-ethylhexyl acrylate.

vinyl esters of saturated carboxylic acids, such as, for example, vinyl acetate or propionate;

unsaturated epoxides.

Examples of unsaturated epoxides are especially:

aliphatic glycidyl esters and ethers such as allyl glycidyl ether, vinyl glycidyl ether, glycidyl maleate and itaconate, glycidyl acrylate and methacrylate, and alicyclic glycidyl esters and ethers such as 2-cyclohexene-1-glycidyl ether, cyclohexene-4,5-diglycidylcarboxylate, cyclohexene-4-glycidyl carboxylate, 5-norbornene-2-methyl-2-glycidyl carboxylate and endocis-bicyclo[2.2.1]-5-heptene-2,3-diglycidyl dicarboxylate.

unsaturated carboxylic acids, their salts and their anhydrides.

Examples of unsaturated dicarboxylic acid anhydrides are especially maleic anhydride, itaconic anhydride, citraconic anhydride and tetrahydrophthalic anhydride.

dienes such as, for example, 1,4-hexadiene.

(A) may include several comonomers.

According to a particular form of the invention the polymer (A), which may be a mixture of several polymers, includes at least 50% and preferably 75% (on a molar basis) of ethylene. The density of (A) may be between 0.86 and 0.98 g/cm$^3$. The MFI (melt index at 190° C., 2.16 kg) is advantageously between 1 and 1000 g/10 min.

As an example of polymers (A) there may be mentioned:

low density polyethylene (LDPE)

high density polyethylene (HDPE)

linear low density polyethylene (LLDPE)

very low density polyethylene (VLDPE)

the polyethylene obtained by metallocene catalysis, that is to say polymers obtained by a copolymerization of ethylene and of alpha-olefins such as propylene, butene, hexene or octene, in the presence of a monosite catalyst generally consisting of a zirconium or titanium atom and of two alkyl cyclic molecules bonded to the metal. More specifically, the metallocene catalysts are usually composed of two cyclopentadiene rings bonded to the metal. These catalysts are often employed with aluminoxanes as cocatalysts or activators, preferably methylaluminoxane (MAO). Hafnium may also be employed as a metal to which the cyclopentadiene is bound. Other metallocenes may include transition metals of groups IV A, V A and VI A. Metals of the lanthanide series may also be employed;

EPR (ethylene-propylene rubber) elastomers

EPDM (ethyl-propylene-diene) elastomers mixtures of polyethylene with an EPR or an EPDM ethylene-alkyl (meth)acrylate copolymers which may contain up to 60% by weight of (meth)acrylate and preferably 2 to 40%;

ethylene-alkyl (meth)acrylate-maleic anhydride copolymers obtained by copolymerization of the three monomers, the proportions of (meth)acrylate being like the above copolymers, the quantity of maleic anhydride being up to 10% and preferably 0.2 to 6% by weight;

ethylene-vinyl acetate-maleic anhydride copolymers obtained by copolymerization of the three monomers, the proportions being the same as in the preceding copolymer.

(A) may also be polypropylene homo- or copolymer. Comonomers that may be mentioned are:

alpha-olefins, advantageously those containing from 3 to 30 carbon atoms. Examples of such alpha-olefins are the same as those cited above, except that propylene is replaced by ethylene in the list;

dienes.

(A) may also be a polypropylene block copolymer.

As example of polymer (A) there may be mentioned:

polypropylene mixtures of polypropylene and EPDM or EPR.

According to a particular form of the invention the polymer (A), which may be a mixture of several polymers, includes at least 50 and preferably 75 mol % of propylene.

(A) may also be poly(1-butene) or copolymers of 1-butene with ethylene or another alpha-olefin containing from 3 to 10 carbons, except for propylene, already mentioned above.

(A) may also be polystyrene or styrene copolymers. Among the copolymers there may be mentioned, as example, dienes containing from 4 to 8 carbon atoms.

The thermoplastic polymer (A) is grafted with a functional monomer. Examples of grafted functional groups that may be mentioned are carboxylic acids and their derivatives, acid chlorides, isocyanates, oxazolines, epoxides, amines and hydroxides.

Examples of unsaturated carboxylic acids are those containing 2 to 20 carbon atoms, such as acrylic, methacrylic, maleic, fumaric and itaconic acids. Functional derivatives of these acids include, for example, anhydrides, ester derivatives, amide derivatives, imide derivatives and the metal salts (such as alkali metal salts) of unsaturated carboxylic acids.

Unsaturated dicarboxylic acids containing 4 to 10 carbon atoms and their functional derivatives, particularly their anhydrides, are particularly preferred grafting monomers.

These grafting monomers include, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other grafting monomers include $C_1$–$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate, amide derivatives of unsaturated carboxylic acids, such as acrylamide, methacrylamide, maleic monoamide, maleic diamide, maleic N-monoethylamide, maleic N,N-diethylamide, maleic N-monobutylamide, maleic N,N-dibutylamide, furamic monoamide, furamic diamide, fumaric N-monoethylamide, fumaric N,N-diethylamide, fumaric N-monobutylamide and furamic N,N-dibutylamide, imide derivatives of unsaturated carboxylic acids, such as maleimide, N-butylmaleimide and N-phenylmaleimide and metal salts of unsaturated carboxylic acids, such as sodium acrylate, sodium methacrylate, potassium acrylate and potassium methacrylate. Maleic anhydride is advantageously employed.

Various known processes can be employed for grafting a functional monomer onto the thermoplastic polymer (A).

For example, this may be done by heating the polymer (A) to an elevated temperature, approximately 150° to approximately 300° C., in the presence or in the absence of a solvent with or without free radical generators, which are also called initiators. Appropriate solvents which may be employed in this reaction are benzene, toluene, xylene, chlorobenzene, cumene and the like. Appropriate radical initiators which may be employed are organic peroxides such as, for example t-butyl hydroperoxide, cumene hydroperoxide, diisopropylbenzene hydroperoxide, di-t-butyl peroxide, t-butyl cumyl peroxide, dicumyl peroxide, 1,3-bis(t-butylperoxyisopropyl)benzene, acetyl peroxide, benzoyl peroxide, isobutyryl peroxide, bis-3,5,5-trimethylhexanoyl peroxide and methyl ethyl ketone peroxide.

Other initiators may be employed, such as azo compounds. Examples which may be mentioned are:

2,2'-azobis(2,4-dimethylvaleronitrile)

2,2'-azo(2-methylpropane)(2,4-dimethyl-4-methoxyvaleronitrile), 2,2'-azobis(isobutyronitrile), 2,2'-azo(2-methylpropane)(2,4-dimethyl-valeronitrile), 2,2'-azo(2-methylpropane)(2-methylpropio-nitrile), 2,2'-azo(2-methylpropane)(2-methylbutyro-nitrile), 2,1-azo(2-methylpropane)(1-cyanocyclohexane), and 2,1-azo(2-methylbutane)(1-cyanocyclohexane).

Stable free radicals may be mentioned as an example of a substance which inhibits or reduces the crosslinking or the depolymerization of the thermoplastic polymer (A).

These stable free radicals must not be confused with the above radicals (produced by the peroxides or the azo compounds) the lifetime of which is ephemeral (a few milliseconds).

By way of illustration of stable free radicals that can be employed according to the present invention there may be mentioned stable nitroxide radicals which include the group =N—O. According to the present invention the stable nitroxide radical may be chosen from the compounds represented by the following formulae:

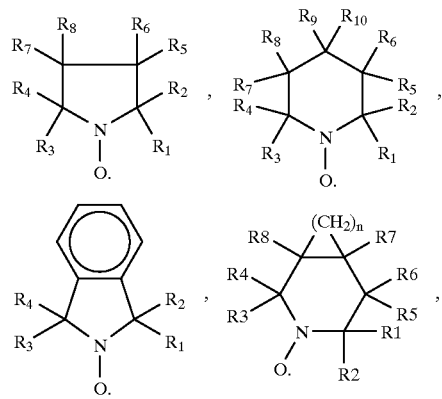

-continued

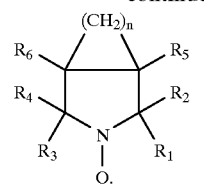 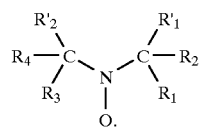

in which R1, R2, R3, R4, R'1 and R'2, which are identical or different, denote a halogen atom such as chlorine or bromine, a saturated or unsaturated, linear, branched or cyclic hydrocarbon group which has a carbon number ranging from 1 to 10, such as an alkyl, cycloalkyl or phenyl radical, or an ester —COOR group or an alkoxy —OR group or a phosphate —P(O)(OR)$_2$ group, in which R is a saturated aliphatic radical which has a carbon number ranging from 1 to 3, and in which R5, R6, R7, R8, R9 and R10, which are identical or different may have the same meaning as R1, R2, R3, R4, R'1 and R'2 or else denote a hydrogen atom, a hydroxyl —OH group or an acid group such as —COOH, —P(O)(OH)$_2$ or —SO$_3$H group.

As illustration of such nitroxides there may be mentioned:

2,2,5,5-tetramethyl-1-pyrrolidinyloxy (PROXYL), 2,2,6,6-tetramethyl-1-piperidinyloxy, generally marketed under the name TEMPO, N-tert-butyl-1-phenyl-2-methylpropyl nitroxide, N-tert-butyl-1-(2-naphthyl)-2-methylpropyl nitroxide, N-tert-butyl-1-diethylphosphono-2,2-dimethylpropyl nitroxide, N-tert-butyl-1-dibenzylphosphono-2,2-dimethylpropyl nitroxide, N-phenyl-1-diethylphosphono-2,2-dimethylpropyl nitroxide, N-phenyl-1-diethylphosphono-1-methylethyl nitroxide, and N-(1-phenyl-2-methylpropyl)-1-diethylphosphono-1-methylethyl nitroxide.

Preferably TEMPO will be employed.

The quantity of functional monomer which is introduced into the process may be between 0.05 and 15% by weight of the polymer (A) and preferably 0.5 to 10%. The quantity of optional radical initiator may be between 0.3 and 100 millimoles per kg of polymer (A), and preferably 2 to 25.

The quantity of stable free radical may be between 0.05 and 200 millimoles per kg of polymer-(A), advantageously from 0.1 to 10 and preferably from 0.3 to 5.

The operation is preferably carried out in an extruder without solvent; the radical initiator and the functional monomer are dispersed on a polymer (A) powder and then introduced into the first zone of the extruder, for example with the aid of a hopper, and then they mix with the polymer (A) which is to be grafted.

Some of the products obtained are new, in particular grafted polypropylenes and polyethylenes which will be described below.

The present invention also relates to grafted polypropylenes which have an MFI of between 5 and 100 (measured at 190° C./325 g) and which contain, by weight, 0.5 to 3% of functional monomer, preferably maleic anhydride.

The term polypropylene should be taken in the sense explained above in the definition of (A).

The present invention also relates to grafted polyethylenes which have an MFI of between 0.1 and 100, advantageously between 0.1 and 30 (measured at 190° C./2.16 kg) and which contain, by weight, 0.5 to 3% of functional monomer, preferably maleic anhydride. The term polyethylene should be taken in the sense explained above in the definition of (A). The polyethylene is preferably high density polyethylene, that is to say a density generally higher than 0.940.

The products obtained by the process of the invention may optionally be diluted in polymers which may be chosen from thermoplastic polymers (A).

The products of the invention may in addition contain the usual additives such as antioxidants, UV absorbers, antistatic agents, pigments, dyes, fillers and the like.

These products are useful as coextrusion binders.

The present invention also relates to a multilayer structure including a layer including the coextrusion binder defined above and, directly attached to it, a layer (E) of nitrogen- or oxygen-containing polar resin, such as a layer of a polyamide resin, of a saponified copolymer of ethylene and vinyl acetate (EVOH) or of a polyester resin, or else a metallic layer.

The invention also relates to a structure including the above structure and directly attached to the latter, on the binder side, either a layer (F) of polyolefin or a layer of a resin chosen from the resins of layer (E) or else a metallic layer.

These structures are useful for manufacturing flexible or rigid packaging such as sachets and bottles for alimentary products. This packaging can be manufactured by coextrusion, lamination or blow-coextrusion.

The multilayer structure of the present invention consists of the layer including the above binder and of a layer (E) of oxygen- or nitrogen-containing polymer resin or a metallic layer.

Examples of preferred polar resins in the layer other than the binder are polyamide resins, a saponified copolymer of ethylene and vinyl acetate and polyesters.

More specifically, they include long-chain synthetic polyamides which have structural units of the amide group in the main chain, such as PA-6, PA-6,6, PA-6,10, PA-11 and PA-12, a saponified copolymer of ethylene and vinyl acetate which has a degree of saponification of approximately 90 to 100 mol %, obtained by saponifying an ethylene/vinyl acetate copolymer which has an ethylene content of approximately 15 to approximately 60 mol %, polyesters such as polyethylene terephthalate, polybutylene terephthalate, polyethylene naphthenate and mixtures of these resins.

The metallic layer may be, for example, a sheet, a film or a sheet of a metal such as aluminium, iron, copper, tin and nickel, or an alloy containing at least one of these metals as main constituent. The thickness of the film or sheet may be suitably chosen and it is, for example, from approximately 0.01 to approximately 0.2 mm. It is common practice to degrease the surface of the metallic layer before laminating the binder of the invention to it. The layer of oxygen- or nitrogen-containing polar resin (E) may also contain known additives in a conventional quantity.

The invention also relates to a structure including, respectively, a layer (F) of polyolefin, a layer of the binder of the invention and either a layer (E) of nitrogen- or oxygen-containing polar resin or a metallic layer.

EXAMPLES

Products employed:

HDPE 2250 MN 53: high density polyethylene of MFI= 25 and of density=0.953 g/cm$^3$ PP 3060 MN 5: polypropylene copolymer containing propylene/ethylene blocks, of density=0.902 g/cm$^3$ and of MFI=6 (230° C./2.16 kg)

Initiator employed: 2,5-dimethyl-2,5-(di-tert-butyl) hexane peroxide (Luperox 101) (DHBP)

Functional monomer: maleic anhydride

Stable nitroxide radical: 2,2,6,6-tetra-methyl-1-piperidinyloxy marketed under the name TEMPO.

Example 1

This example describes the grafting of polypropylene with maleic anhydride in the presence of peroxide. A corotative twin-screw extruder of Werner 30 type is employed in the following conditions:

The extruder is made up of 8 zones Z1 to Z8. The temperatures in the zones are between 150 and 280° C.

The maleic anhydride and the peroxide, which are dispersed on polymer powder, and the PP 3060 MN 5 to be grafted are introduced via a hopper into zone Z1.

1.5% by weight of maleic anhydride and 17.2 millimol/kg of DHBP are introduced.

The temperatures in zones Z3, Z4 and Z5 are at least sufficient for 99.9% of the radical initiator to react before zone Z6. The initiator employed is 2,5-dimethyl-2,5-(di-tert-butyl)hexane peroxide (Luperox 101) (DHBP).

The residues of the radical initiator, the solvent and the unreacted maleic anhydride are degassed under vacuum in zone Z6.

The extrusion output at the exit of zone Z8 varies according to the screw speed, set at between 10 and 15 kg/h.

The lace is granulated after cooling.

The product is characterized using the melt index (MFI under 2.16 kg at 190° C., expressed in dg/min) and the grafted maleic anhydride (MA) content (expressed in mass per cent).

Example 2

Identical with Example 1 but a quantity of TEMPO equal to 3.2 millimol/kg is introduced continuously.

TEMPO in solution in an appropriate solvent is introduced by a metering pump into zone Z1.

Example 3

Identical with Example 1 but a quantity of TEMPO equal to 4.8 millimol/kg is introduced continuously.

TEMPO in solution in an appropriate solvent is introduced by a metering pump into zone Z1.

Example 4

This example describes the grafting of high density polyethylene with maleic anhydride in the presence of peroxide. A corotative twin-screw extruder of Werner 30 type is employed in the following conditions:

The extruder is made up of 8 zones Z1 to Z8. The temperatures in the zones are between 150 and 280° C.

The maleic anhydride and the peroxide, which are dispersed on polymer powder and the HDPE 2250 MN 53 to be grafted are introduced via a hopper into zone Z1.

2% by weight of maleic anhydride and 4.8 millimol/kg of DHBP are introduced.

The temperatures in zones Z3, Z4 and Z5 are at least sufficient for 99.9% of the radical initiator to react before zone Z6. The initiator employed is 2,5-dimethyl-2,5-(di-tert-butyl)hexane peroxide (Luperox 101)(DHBP).

The residues of the radical initiator, the solvent and the unreacted maleic anhydride are degassed under vacuum in zone Z6.

The extrusion output at the exit of zone Z9 varies according to the screw speed, set at between 10 and 15 kg/h.

The lace is granulated after cooling.

Example 5

Identical with Example 4 but a quantity of TEMPO equal to 0.38 millimol/kg is introduced continuously.

TEMPO in solution in an appropriate solvent is introduced by a metering pump into zone Z1.

Example 6

Identical with Example 4 but a quantity of TEMPO equal to 0.80 millimol/kg is introduced continuously.

TEMPO in solution in an appropriate solvent is introduced by a metering pump into zone Z1.

Example 7

Identical with Example 4 but a quantity of TEMPO equal to 1.6 millimol/kg is introduced continuously.

TEMPO in solution in an appropriate solvent is introduced by a metering pump into zone Z1.

Example 8

Identical with Example 4 but a quantity of TEMPO equal to 3.2 millimol/kg is introduced continuously.

TEMPO in solution in an appropriate solvent is introduced by a metering pump into zone Z1.

Example 9

Identical with Example 4, but the content of maleic anhydride introduced is equal to 4% and that of DHBP equal to 9.6 millimol/kg.

Example 10

Identical with Example 9 but a quantity of TEMPO equal to 3.2 millimol/kg is introduced continuously.

TEMPO in solution in an appropriate solvent is introduced by a metering pump into zone Z1.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

Summary Table

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Polymer | PP 3060 MN 5 | PP 3060 MN 5 | PP 3060 MN 5 | HDPE 2250 MN 53 | HDPE 2250 MN 53 | HDPE 2250 MN 53 | HDPE 2250 MN 53 | HDPE 2250 MN 53 | HDPE 2250 MN 53 | HDPE 2250 MN 53 |
| Maleic anhydride (%) | 1.5 | 1.5 | 1.5 | 2 | 2 | 2 | 2 | 2 | 4 | 4 |
| DHBP (mmol/kg) | 17.2 | 17.2 | 17.2 | 4.8 | 4.8 | 4.8 | 4.8 | 4.8 | 9.6 | 9.6 |
| TEMPO (mmol/kg) | 0 | 3.2 | 4.8 | 0 | 0.38 | 0.80 | 1.6 | 3.2 | 0 | 3.2 |
| MFI | 57* | 29* | 12* | 3** | 8.8** | 12** | 14.4** | 20** | 0.37** | 6.3** |
| Maleic anhydride grafted (%) | 0.9 | 0.9 | 0.8 | 1.4 | 1.3 | 1 | 0.8 | 0.5 | 2.2 | 1.7 |

*325 g/190° C.
**2.16 kg/190° C.

I claim:

1. Process comprising preparing graft thermoplastic polymers in which at least one thermoplastic polymer (A) being grafted with a functional monomer in the presence of a substance which inhibits or reduces the crosslinking or the depolymerization of (A).

2. Process according to claim 1, wherein the substance that inhibits or reduces the crosslinking or the depolymerization of (A) is a stable nitroxide radical including the group =N—O.

3. Process according to claim 1, wherein the polymer (A) is selected from the group consisting of polyethylenes, polypropylenes, polybutenes and polystyrenes, these polymers being homo- or copolymers.

4. Process according to claim 1, wherein the functional monomer is maleic anhydride.

5. Process according to claim 1, wherein the quantity of stable nitroxide radical is between 0.05 and 200 millimoles per kg of polymer (A).

6. Process according to claim 5, wherein the quantity is between 0.1 and 10.

* * * * *